US007089002B2

(12) United States Patent
Wallentin

(10) Patent No.: US 7,089,002 B2
(45) Date of Patent: Aug. 8, 2006

(54) RELEASING PLURAL RADIO CONNECTIONS WITH OMNIBUS RELEASE MESSAGE

(75) Inventor: Bo Stefan Pontus Wallentin, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 817 days.

(21) Appl. No.: 09/852,915

(22) Filed: May 11, 2001

(65) Prior Publication Data
US 2002/0168984 A1    Nov. 14, 2002

(51) Int. Cl.
*H04Q 7/20* (2006.01)
(52) U.S. Cl. .................... 455/434; 455/422.1; 370/312
(58) Field of Classification Search ............ 455/452.1, 455/452.2, 436, 424, 450; 370/397, 398
See application file for complete search history.

(56) References Cited

U.S. PATENT DOCUMENTS

| 4,984,290 | A | 1/1991 | Levine et al. | |
| 6,173,173 | B1 | 1/2001 | Dean et al. | |
| 6,532,227 | B1 * | 3/2003 | Leppisaari et al. | 370/348 |
| 2001/0034228 | A1 * | 10/2001 | Lehtovirta et al. | 455/424 |

FOREIGN PATENT DOCUMENTS

| EP | 0 708 571 A2 | 4/1996 |
| WO | 95/15665 | 6/1995 |
| WO | 98/48581 A1 | 10/1998 |
| WO | 00/30378 A1 | 5/2000 |
| WO | 00/76243 A1 | 12/2000 |
| WO | 01/80591 A2 | 10/2001 |
| WO | 02/45456 A1 | 6/2002 |

OTHER PUBLICATIONS

International Preliminary Examination Report mailed Jul. 7, 2003 in corresponding PCT Application No. PCT/SE92/00884.
International Search Report mailed Nov. 6, 2002.
Corrected International Search Report mailed Nov. 13, 2002.
3GPP Technical Spec., Universal Mobile Telecommunications System (UMTS); RCC Protocol Specification (3G TS 25.331, version 3.1.0 Release 1999, pp. 1-283, XP002168727, no month listed.

* cited by examiner

*Primary Examiner*—Temica Beamer
(74) *Attorney, Agent, or Firm*—Nixon & Vanderhye, P.C.

(57) ABSTRACT

An omnibus connection release message transmitted from a control node of radio access network is used to release plural radio connections, thereby obviating problems attending transmission of plural release messages. In accordance with a first example, a control node of the radio access network prepares the omnibus release message so that, when a first selected parameter thereof has a predetermined value, all radio connections controlled by the radio network control (RNC) node are released. The first selected parameter can be included in a mobile terminal global identity information element of the omnibus release message (e.g., in a Radio Network Temporary Identity (U-RNTI) information element of the omnibus release message, such as a Serving Radio Network Temporary Identity (S-RNTI) information element).

61 Claims, 9 Drawing Sheets

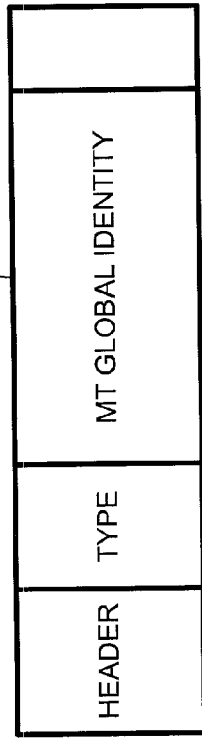

Fig. 3
GENERIC CONNECTION RELEASE MESSAGE

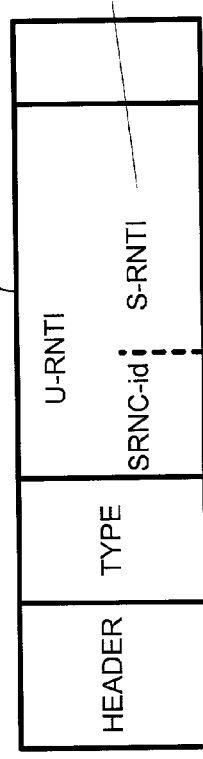

Fig. 4
FIRST MODE: GENERIC CONNECTION RELEASE MESSAGE WITH OMNIBUS RELEASE CAPABILITY

- S-RNTI IN RESERVED RANGE > OMNIBUS CONNECTION RELEASE
- S-RNTI IN NON-RESERVED RANGE > INDIVIDUAL UE RELEASE

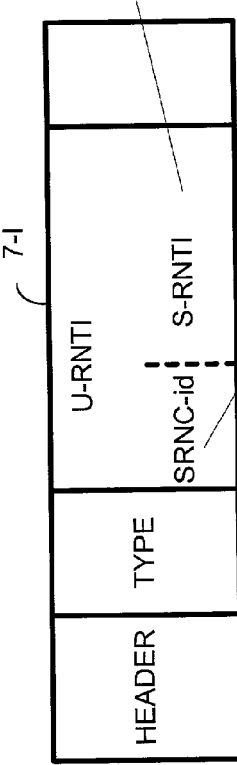

Fig. 7
SECOND MODE: GENERIC CONNECTION RELEASE MESSAGE WITH OMNIBUS RELEASE CAPABILITY

- S-RNTI IN S-RNTI RESERVED RANGE > OMNIBUS CONNECTION RELEASE
- S-RNTI NOT IN S-RNTI NON-RESERVED RANGE > INDIVIDUAL UE RELEASE

- SRNC-id IN SRNC-id RESERVED RANGE > OMNIBUS RELEASE
- SRNC-id NOT IN SRNC-id RESERVED RANGE > INDIVIDUAL UE RELEASE

RELEASING PLURAL RADIO CONNECTIONS WITH OMNIBUS RELEASE MESSAGE

BACKGROUND

1. Field of the Invention

The present invention pertains to wireless telecommunications, and particularly to release of radio connections in a radio access network.

2. Related Art and Other Considerations

In a typical cellular radio system, mobile user equipment units (UEs) communicate via a radio access network (RAN) to one or more core networks. The term "user equipment unit (UE)" herein is used synonymously with mobile terminal and mobile station. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cells, with each cell being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core network nodes.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to user equipment units (UEs).

As those skilled in the art appreciate, in W-CDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". In some instances, a connection involves both a Serving or Source RNC (SRNC) and a target or drift RNC (DRNC), with the SRNC controlling the connection but with one or more diversity legs of the connection being handling by the DRNC. An Inter-RNC transport link can be utilized for the transport of control and data signals between Source RNC and a Drift or Target RNC, and can be either a direct link or a logical link as described, for example, in International Application Number PCT/US94/12419 (International Publication Number WO 95/15665). An interface between radio network controllers (e.g., between a Serving RNC [SRNC] and a Drift RNC [DRNC]) is termed the "Iur" interface.

The radio network controller (RNC) controls the UTRAN. In fulfilling its control role, the RNC manages resources of the UTRAN. Such resources managed by the RNC include (among others) the downlink (DL) power transmitted by the base stations; the uplink (UL) interference perceived by the base stations; and the hardware situated at the base stations.

Those skilled in the art appreciate that, with respect to a certain RAN-UE connection, an RNC can either have the role of a serving RNC (SRNC) or the role of a drift RNC (DRNC). If an RNC is a serving RNC (SRNC), the RNC is in charge of the connection with the user equipment unit (UE), e.g., it has full control of the connection within the radio access network (RAN). A serving RNC (SRNC) is connected to the core network. On the other hand, if an RNC is a drift RNC (DRNC), its supports the serving RNC (SRNC) by supplying radio resources (within the cells controlled by the drift RNC (DRNC)) needed for a connection with the user equipment unit (UE). A system which includes the drift radio network controller (DRNC) and the base stations controlled over the Iub Interface by the drift radio network controller (DRNC) is herein referenced as a DRNC subsystem or DRNS.

Operation of a user equipment unit (UE) is conceptualized as having two modes: an Idle Mode and a Connection Mode. The Idle Mode is entered after power on. In Idle Mode there is no connection between the user equipment unit (UE) and the UTRAN. When a connection is established, the user equipment unit (UE) is assigned a U-RNTI and the user equipment unit (UE) enters Connected Mode. The U-RNTI (UTRAN Radio Network Temporary Identity) is a global identity, which can be used in any cell in the UTRAN.

Within Connected Mode there are four different states: CELL_DCH state; CELL_FACH state; CELL_PCH state; and URA_PCH . Each state reflects a different level of activity.

A release of a radio connection between the radio access network (like UTRAN) and the mobile terminal (like the user equipment unit (UE)) involves the mobile terminal leaving the connected mode and entering the idle mode. In current cellular systems, there are several methods for releasing the connection. In the normal case, the network or user equipment unit (UE) sends a RELEASE message to the other party on the dedicated control channel (DCCH). The other party acknowledges, either indirectly by releasing the channel which can be detected or by transmitting a RELEASE COMPLETE or similar acknowledgement message, and enters the idle mode, and the initiating party can enter idle mode as well. After the release, the U-RNTI that was allocated by the now-released connection can be reused by another connection.

A possibility has been introduced in WCDMA to transmit the RELEASE message on a common control channel (CCCH). The purpose of this solution is to enable the DRNC to release the connection to a given user equipment unit (UE), if the SRNC can not transmit the message (the DCCH originates in the SRNC).

In a failure case, when the radio connection is lost, the user equipment unit (UE) and UTRAN enter Idle Mode when a failure is detected. Failure detection is quickest in the CELL_DCH state, as the physical channel is lost in that case. In the CELL_FACH, CELL_PCH and URA_PCH states, failure detection is much slower since it relies on a periodic supervision mechanism every set number of minutes, where the user equipment unit (UE) makes periodic CELL UPDATE or URA UPDATE depending on the state.

In the conventional practice, only one user equipment unit (UE) at a time can be released using the RELEASE message sent from UTRAN to the user equipment unit (UE). Radio connection release on a UE by UE basis is satisfactory in most situations. However, in a failure situation when all connections belonging to an RNC (SRNC or DRNC) have to be released (like restart of RNC or a reset is received from the core network), this conventional practice entails an enormous amount of signaling messages. Such massive signaling causes significant load in the radio network control (RNC) node(s) as well over the radio interface. Since the resources are limited, the RELEASE messages can not be sent instantaneously to all UEs and thus they will take some time to transmit. This delay will typically cause inconvenience for the user. Moreover, this delay increases a risk that a U-RNTI, already in use by a first user equipment unit (UE), will be prematurely allocated to a new connection. Furthermore, in case of restart of an radio network control (RNC) node, the RNC may forget which U-RNTIs were allocated to user equipment units (UEs) before the restart.

What is needed, therefore, and an object of the present invention, is a technique for providing more efficient release of radio connections in a radio access network.

BRIEF SUMMARY OF THE INVENTION

One aspect of the present invention concerns a method of operating a radio access network wherein plural radio connections are released using a single release message known as the omnibus release message. Another aspect of the present invention concerns the radio access network, and a control node thereof, which releases the plural radio connections using the omnibus release message. Yet another aspect of the present invention is a mobile terminal which recognizes the omnibus release message transmitted from the radio access network, and which releases its radio connection(s) in response thereto.

In accordance with a first example mode of the present invention, a control node of the radio access network prepares the omnibus release message so that, when a first selected parameter thereof has a predetermined value, all radio connections controlled by the radio network control (RNC) node are released. The predetermined value may be a value in a reserved range of values, utilization of any of the values in the reserved range of values for the first parameter indicating that all radio connections controlled by the radio network control (RNC) node are released. In the first example mode, the first selected parameter is included in a mobile terminal global identity information element of the omnibus release message. For example, the first selected parameter can be included in a Radio Network Temporary Identity (U-RNTI) information element of the omnibus release message, such as a Serving Radio Network Temporary Identity (S-RNTI) information element. In the first mode, the radio network control (RNC) node can be either a serving radio network control (SRNC) node or a drift radio network control (DRNC) node. In one illustrated implementation, the first mode is executed (e.g., the omnibus release message is prepared) upon failure of the serving radio network control (SRNC) node.

In accordance with a second example mode of the present invention, a control node of the radio access network prepares the omnibus release message so that, when a first selected parameter thereof has a first predetermined value and a second selected parameter thereof has a second predetermined value, all radio connections in cells controlled by the radio network control node are released. In this second mode, the radio network control node which prepares the omnibus release message is a drift radio network control (DRNC) node, and preparation of the omnibus release message occurs upon failure of the drift radio network control (DRNC) node. As in the first mode, in the second mode the first selected parameter can belong to a first reserved range of values and the second selected parameter can belong to a second reserved range of values. In an example implementation of the second mode, both the first selected parameter and the second selected parameter are included in a mobile terminal global identity information element of the omnibus release message, e.g., in a Radio Network Temporary Identity (U-RNTI) information element of the omnibus release message. For example, the first selected parameter can be in a Serving Radio Network Temporary Identity (S-RNTI) information element, while the second selected parameter can be included in an information element which identifies a serving radio network control (SRNC) node.

In illustrated implementations, the omnibus release message is transmitted either on a common control channel (CCCH) in a CELL_FACH state, or on a paging channel (PCH).

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3 is a diagrammatic view showing a generic release message.

FIG. 4 is a diagrammatic view showing how a generic connection release message can obtain omnibus release capability for the first mode of FIG. 1.

FIG. 7 is a diagrammatic view showing how a generic connection release message can obtain omnibus release capability for the second mode of FIG. 5.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
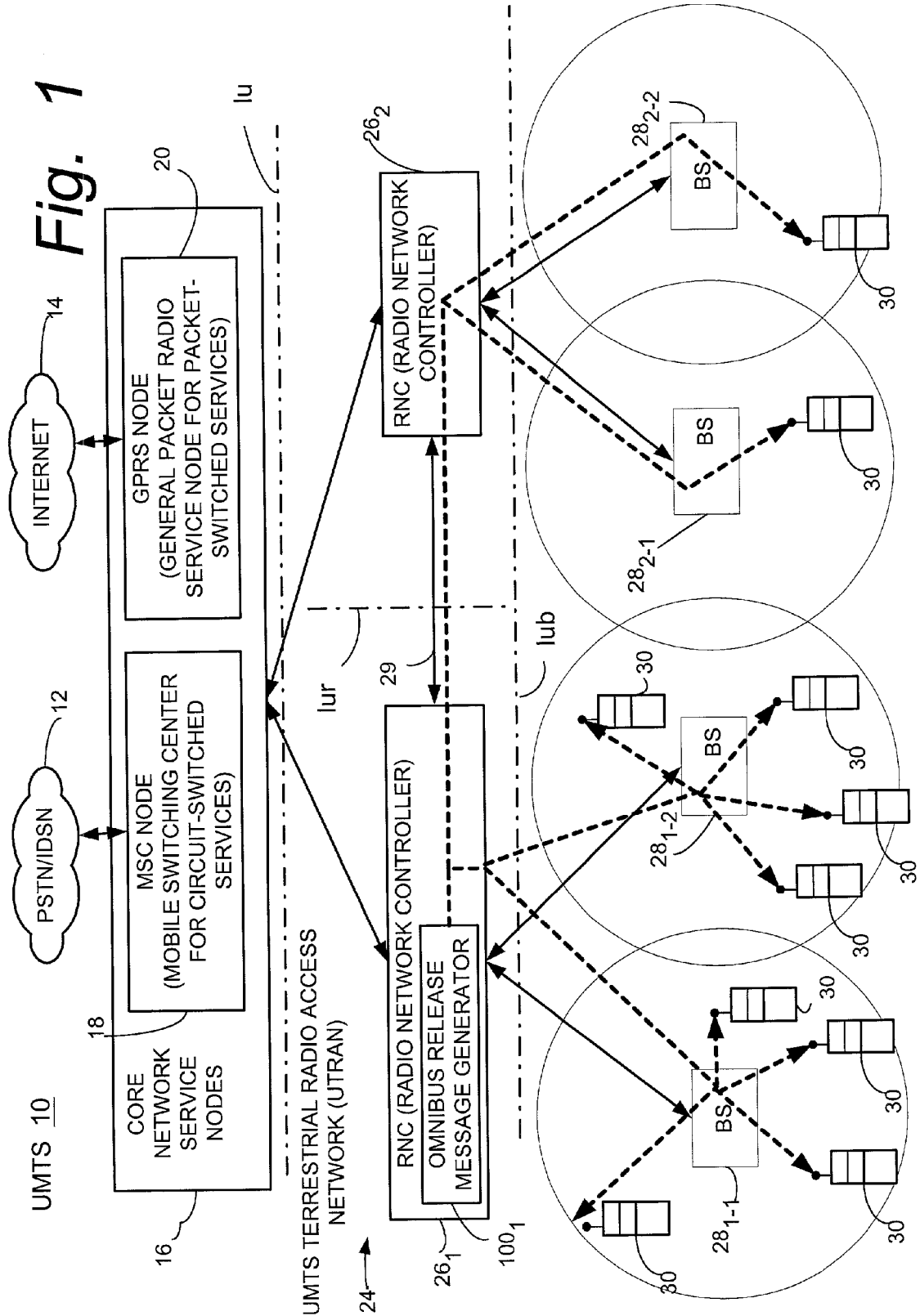
FIG. 1 is diagrammatic view of example mobile communications system showing usage of an omnibus release message to release plural radio connections according a first example mode of the present invention.

A first mode of the present invention is described in the non-limiting, example context of a universal mobile telecommunications (UMTS) 10 shown in FIG. 1. A representative, connection-oriented, external core network, shown as a cloud 12 may be (for example) the Public Switched Telephone Network (PSTN) and/or the Integrated Services Digital Network (ISDN). A representative, connectionless-oriented external core network shown as a cloud 14, may be for example the Internet. Both core networks are coupled to their corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN).

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 1 is shown with only two RNC nodes, particularly RNC $26_1$, and RNC$26_2$. Each RNC 26 is connected to a plurality of base stations (BS) 28. For example, and again for sake of simplicity, two base station nodes are shown connected to each RNC 26. In this regard, RNC $26_1$, serves base station $28_{1-1}$ and base station $28_{1-2}$, while RNC $26_2$ serves base station $28_{2-1}$ and base station $28_{2-2}$. It will be appreciated that a different number of base stations can be served by each RNC, and that RNCs need not serve the same number of base stations. Moreover, FIG. 1 shows that an RNC can be connected over an Iur interface to one or more other RNCs in the URAN 24.

In the illustrated embodiments, for sake of simplicity each base station 28 is shown as serving one cell. Each cell is represented by a circle which surrounds the respective base station. It will be appreciated by those skilled in the art, however, that a base station may serve for communicating across the air interface for more than one cell. For example, two cells may utilize resources situated at the same base station site.

BRIEF SUMMARY OF THE INVENTION

User equipment units (UEs), such user equipment units (UEs) 30 shown in FIG. 1, each communicate with one or more cells or one or more base stations (BS) 28 over a radio or air interface. Each of the Iu interface, the Iub interface, and the Iur interface are shown by dash-dotted lines in FIG. 1; the air interface 32 is shown by a dash-dotted line in FIG. 8.

Preferably, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station or equipment unit (UE) 30 is assigned its own scrambling code in order for a base station 28 to identify transmissions from that particular user equipment unit (UE) as well as for the user equipment unit (UE) to identify transmissions from the base station intended for that user equipment unit (UE) from all of the other transmissions and noise present in the same area.

Different types of control channels may exist between one of the base stations 28 and user equipment units (UEs) 30. For example, in the forward or downlink direction, there are several types of broadcast channels including a general broadcast channel (BCH), a paging channel (PCH), a common pilot channel (CPICH), and a forward access channel (FACH) for providing various other types of control messages to user equipment units (UEs). In the reverse or uplink direction, a random access channel (RACH) is employed by user equipment units (UEs) whenever access is desired to perform location registration, call origination, page response, and other types of access operations. The random access channel (RACH) is also used for carrying short data packets, such as web page requests in a web browser application, for example.

As set up by the control channels, traffic channels (TCH) are allocated to carry substantive call communications with a user equipment unit (UE). Some of the traffic channels can be common traffic channels, while others of the traffic channels can be dedicated traffic channels (DCHs).

Figure 8:
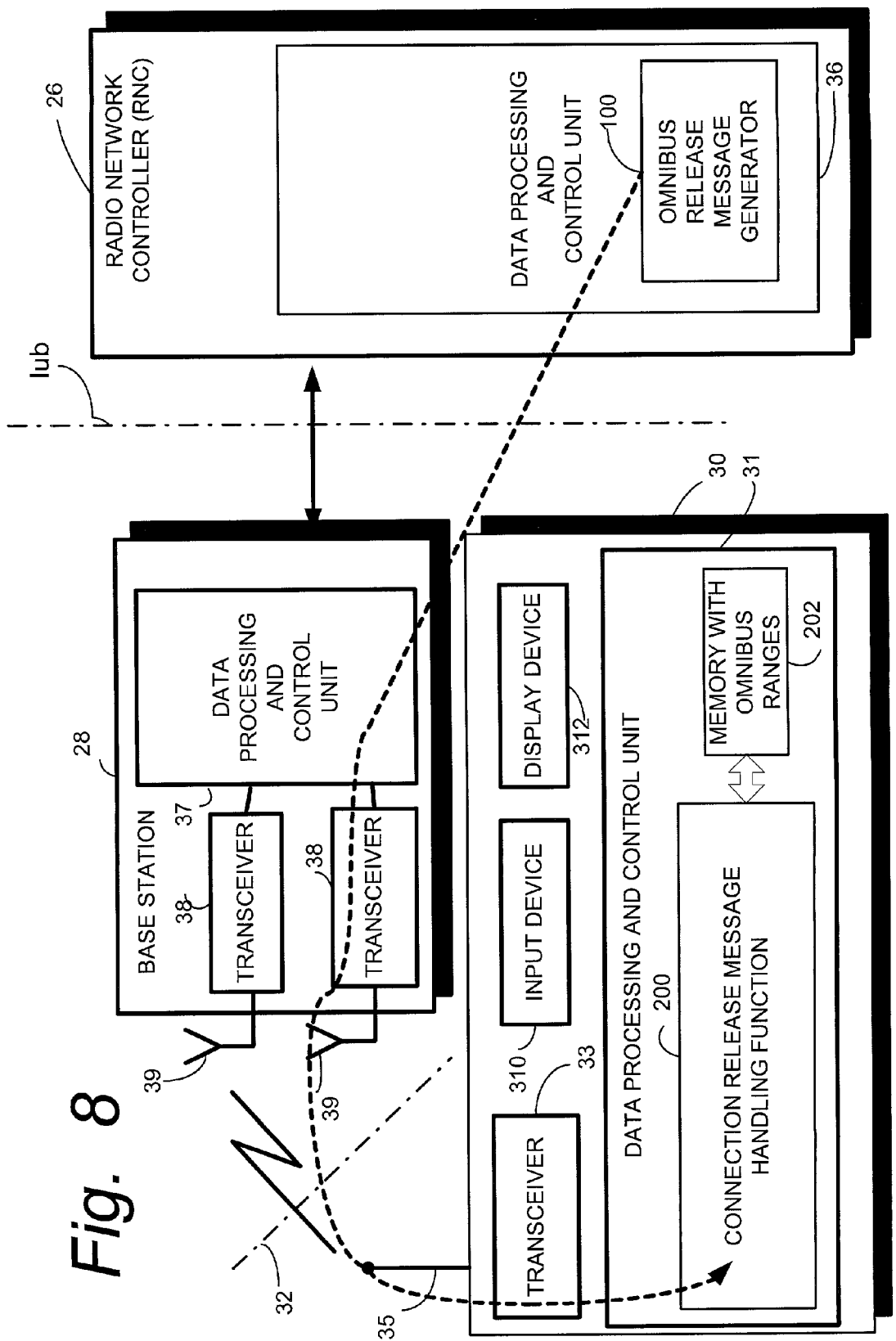
FIG. 8 is a diagrammatic view showing various aspects of a user equipment unit (UE) which processes a connection release message, together with certain basic aspects of a base station node and a radio network controller node.

FIG. 8 shows selected general aspects of user equipment unit (UE) 30 and illustrative nodes such as radio network controller 26 and base station 28. The user equipment unit (UE) 30 shown in FIG. 8 includes a data processing and control unit 31 for controlling various operations required by the user equipment unit (UE). The UE's data processing and control unit 31 provides control signals as well as data to a radio transceiver 33 connected to an antenna 35. In addition to other functionalities herein after described, the user equipment unit (UE) 30 can have user-interactive or user-viewable devices, such as an input device 310 and a display device 312.

The example radio network controller 26 and base station 28 as shown in FIG. 8 are radio network nodes that each include a corresponding data processing and control unit 36 and 37, respectively, for performing numerous radio and data processing operations required to conduct communications between the RNC 26 and the user equipment units (UEs) 30. Part of the equipment controlled by the base station data processing and control unit 37 includes plural radio transceivers 38 connected to one or more antennas 39.

The present invention particularly concerns the release of radio connections, and advantageously features an omnibus connection release message generated by and transmitted from a control node of radio access network. The omnibus release message is employed to release plural radio connections involving plural user equipment units (UEs), thereby obviating problems attending what otherwise would be transmission of plural release messages.

The omnibus release message of the present invention is a multi-connection release message in the sense that it serves to release plural radio connections involving respective plural user equipment units (UEs). The omnibus release message of the present invention is also a single release message in the sense that its payload need be transmitted only once from a control node to a base station in order to release all radio connections controlled by the control node and served by the base station. When the control node controls plural base stations and the control node has broadcasting or multicasting capabilities, the omnibus release message is a single release message in the sense that it is the only release message that need be generated in order to release all radio connections involving user equipment units (UEs) served by base stations controlled by the control node. Moreover, if the control node is a serving radio network control node and radio connections controlled thereby utilize resources controlled by a drift radio network control node, the omnibus release message is a single release message in the sense that only one application of the payload of the omnibus release message is necessary for releasing all radio connections controlled by the control node which utilize resources of the drift radio network control node.

FIG. 1 depicts a first example mode of the present invention, wherein a control node in the form of serving radio network controller (RNC) $26_1$, has an omnibus release message generator $100_1$. As shown by the broken line in FIG. 1, the omnibus release message produced by omnibus release message generator $100_1$, is applied by serving radio network controller (RNC) $26_1$, over the Iub interface to each of the base stations $28_1$ and $28_{1-2}$ controlled by serving radio network controller (RNC) $26_1$, as well as to drift radio network controller (DRNC) $26_2$ over inter-RNC link 29.

It is thus presumed in the FIG. 1 scenario that both base stations $28_{1-1}$ and $28_{1-2}$ currently have radio connections controlled by serving radio network controller (RNC) $26_1$, and that drift radio network controller (DRNC) $26_2$ currently controls resources involved in radio connections controlled by serving radio network controller (RNC) $26_1$. In fact, in the scenario shown in FIG. 1 both base station $28_{1-1}$ and base station $28_{1-2}$ serve four illustrated user equipment units (UEs) 30 which are involved in radio connections controlled by serving radio network controller (RNC) $26_1$. Moreover, radio network controller (DRNC) $26_2$ serves as a drift radio network controller for radio connections involving two user equipment units (UEs) 30, one of the user equipment units (UEs) being served by base station $28_{2-1}$ and another of the user equipment units (UEs) being served by base station $28_{2-2}$. It will be appreciated that the examples of four user equipment units (UEs) per cell controlled by serving radio network controller (RNC) $26_1$, and one user equipment unit (UE) per cell controlled by drift radio network controller (DRNC) $26_2$, are simplistic examples employed for ease of illustration. Likely a greater number of radio connections are involved but per cell, but it is also possible that a lesser number of radio connections may be served by a given cell. In any event, radio connections involving all the user equipment units (UEs) shown in FIG. 1 are released upon generation and transmission of the omnibus release message depicted by the broken line in FIG. 1.

Figure 2:
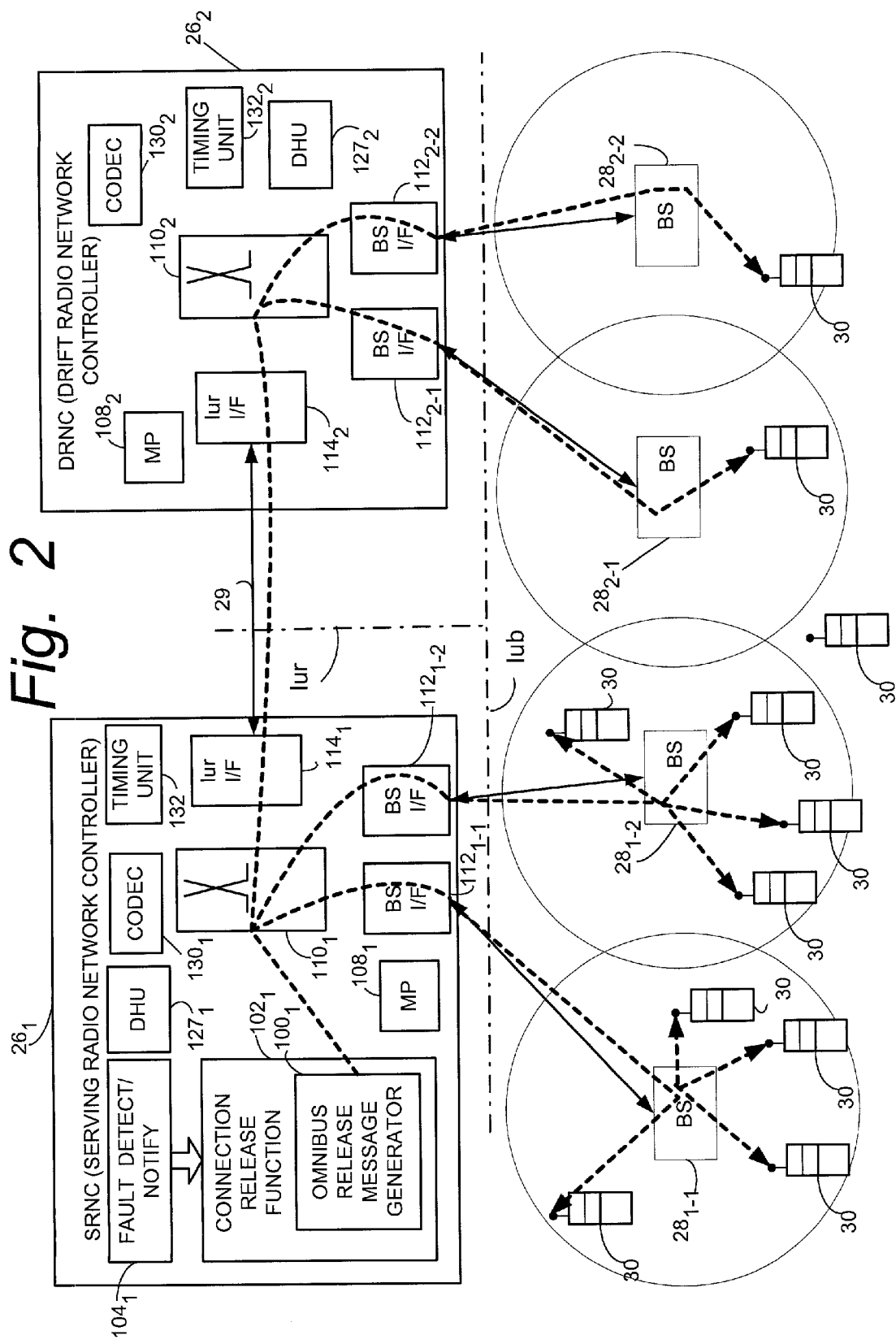
FIG. 2 is diagrammatic view showing, in more detailed, portions of a representative implementation of the example mobile communications system of the first mode of FIG. 1.

FIG. 2 shows, in somewhat more detail, portions of a representative implementation of the first mode of the invention. In FIG. 2, the omnibus release message generator $100_1$ is shown as comprising a connection release function $102_1$ which is situated at serving radio network controller (RNC) $26_1$. The connection release function $102_1$ serves to prepare a regular connection release message using a generic format. A regular connection release message is the usual type of connection release message generated by serving radio network controller (RNC) $26_1$, and is generated and transmitted when a radio connection with an individual user equipment unit (UE) is to be released. The omnibus release message generator $100_1$ can be a special routine or subset of the connection release function $102_1$ as shown, or if desired can be a separate function or unit. In any event, when invoked the omnibus release message generator $100_1$ serves to transform a generic connection release message (such as that shown in FIG. 3) in to an omnibus release message which effects connection release of plural connections involving plural user equipment units (UEs).

In the illustrated embodiment, the omnibus release message generator $100_1$ is invoked when there is a fault or failure at serving radio network controller (RNC) $26_1$. FIG. 1 shows a fault detect/notify unit $104_1$ which notifies connection release function $102_1$, and omnibus release message generator $100_1$ in particular, of a failure or fault at serving radio network controller (RNC) $26_1$ which requires releasing of all radio connections controlled by serving radio network controller (RNC) $26_1$. The fault detect/notify unit $104_1$ can either detect faults or failures of serving radio network controller (RNC) $26_1$, or receive an external indication (e.g., from core network 16) of a perceived fault or failure at serving radio network controller (RNC) $26_1$.

In addition to the components/functions already described, in the example implementation serving radio network controller (RNC) $26_1$ comprises other elements such as a main processor (MP) $108_1$; switch $110_1$; an interface (BS I/F) $112_{1-1}$ to base station $28_{1-1}$; an interface (BS I/F) $112_{1-2}$ to base station $28_{1-2}$; an interface (Iur I/F) 114 to drift radio network controller (DRNC) $26_2$; a diversity handover unit $127_1$; a codec $130_1$; and a timing unit $132_1$.

FIG. 3 simplistically illustrates relevant aspects of an example generic connection release message useful for explaining the present invention. The connection release message of FIG. 3 comprises a header 3-H, a message type information element 3-T, and a mobile terminal (MT) global identity information element 3-I. In conventional use, the mobile terminal (MT) global identity information element 3-I includes a designation of a single user equipment unit (UE) involved in a radio connection to be released. The U-RNTI (UTRAN Radio Network Temporary Identity) of the single affected mobile terminal can be inserted in the information element 3-I of the release message of FIG. 3.

FIG. 4 shows how the omnibus release message generator $100_1$ of the first example mode of the invention transforms the generic connection release message of FIG. 3 into the inventive omnibus release message. In this regard, FIG. 4 depicts that the U-RNTI information element 4-I actually comprises two portions, particularly a SRNC-id information element portion and a S-RNTI information element portion. The SRNC-id information element is typically an identifier of the SRNC which serves the user equipment unit (UE) affected by the conventional connection release message. The S-RNTI information element is a number allocated by that SRNC for distinguishing the user equipment unit (UE) within that SRNC.

When the omnibus release message generator $100_1$ of the first example mode of the invention is invoked (e.g., by fault detect/notify unit $104_1$) to generate a omnibus release message, the omnibus release message generator $100_1$ transforms the generic connection release message by inserting into the S-RNTI information element a predetermined value which indicates that all radio connections controlled by the radio network control node are released. As shown in FIG. 4, The predetermined value may be a value in a reserved range of values, utilization of any of the values in the reserved range of values for the first parameter indicating that all radio connections controlled by the radio network control (RNC) node are released.

It will be appreciated that the omnibus release message generator $100_1$ can function in various ways in the example scenario of FIG. 2. For example, the omnibus release message generator $100_1$ may prepare a single omnibus release message which can, for example, be encapsulated in one or more cells or packets and applied to switch $110_1$. A destination address parameter or the like in header 4-H of the omnibus release message can apprise the switch $110_1$ that the omnibus release message is to be broadcast or multicast to each of base station interface $121_{1-1}$; base station interface $112_{1-2}$; and Iur interface 114. In such broadcast/multicast mode, the switch $110_1$ essentially makes copies the omnibus release message and routes the copies respectively to each of base station interface $112_{1-1}$; base station interface $112_{1-2}$; and Iur interface 114. The copies of the omnibus release message are applied by base station interface $112_{1-1}$, base station interface $112_{1-2}$, and Iur interface 114 to base station $28_{1-1}$, base station $28_{1-2}$, and drift radio network controller (DRNC) $26_2$, respectively.

Upon receipt of their copies of the omnibus release message, each base station $28_{1-1}$ and $28_{1-2}$ transmits the payload of the omnibus release message over the air interface to all user equipment units (UEs) served thereby. Upon receipt of its copy of the omnibus release message, logic provided at the drift radio network controller (DRNC) $26_2$ applies copies the omnibus release message to each of base station $28_{2-1}$ and $28_{2-2}$, which in turn transmits the payload of the omnibus release message over the air interface to all user equipment units (UEs) involved in connections controlled by serving radio network controller (RNC) $26_1$ but utilizing resources controlled by drift radio network controller (DRNC) $26_2$.

Receipt of a omnibus release message at an example user equipment unit (UE) is depicted by a broken line in FIG. 8. As shown in FIG. 8, user equipment unit (UE) 30 includes a connection release message handling function 200 which is capable, e.g., of decoding the generic connection release message and of determining whether a connection release message is an omnibus release message. To this end, connection release message handling function 200 has access to a memory 202 which has stored therein, e.g., the predetermined value or reserved range which specifies that a connection release message is a omnibus release message. In other words, the values stored in memory 202 are those utilized by omnibus release message generator 100 to prepare the S-RNTI information element of the omnibus release message of FIG. 4 and are used by connection release message handling function 200 to ascertain if an incoming connection release message is applicable to all user equipment units (UEs). Of course, the memory 202 can also store the U-RNTI currently accorded to the individual user equipment unit (UE) in which the memory 202 is situated. When the connection release message handling function 200 determines that a received connection release message is uniquely addressed to this user equipment unit (UE), or that an omnibus release message has been received, the user equipment unit (UE) enters an idle mode, as hereinafter described with reference to FIG. 9.

Incidentally, FIG. 8 also shows that, in an illustrated example implementation, connection release message handling function 200 is part of data processing and control unit 31 of user equipment unit (UE) 30, and that omnibus release message generator $100_1$ is in data processing and control unit 36 of serving radio network controller (RNC) $26_1$. Such example situation of omnibus release message generator 100 and connection release message handling function 200 is non-limiting, as it should be understood that these functions may be implemented in sundry and various ways, including but not limited to using individual hardware circuits, using software functioning in conjunction with a suitably programmed digital microprocessor or general purpose computer, using an application specific integrated circuit (ASIC), and/or using one or more digital signal processors (DSPs).

It should also be understood that the omnibus release message generator $100_1$ of the first mode of FIG. 2, rather than apply a sole omnibus release message to switch $110_1$ for copying and distribution by switch $110_1$, could instead generate the same omnibus release message (albeit with different ultimate destination addresses in the header 3-H) for each of the base stations controlled by serving radio network controller (RNC) $26_1$ and each drift RNC utilized by serving radio network controller (RNC) $26_1$. In the illustrated embodiment, such would result in generation of three omnibus release messages. However, it must be kept in mind that at least some, and possibly all, of the thusly generated omnibus release messages are eventually transmitted to plural user equipment units (UEs). Therefore, even in this scenario of multiplying generating the omnibus release message, the number of connection release messages is much less than would otherwise occur if a connection release message were sent separately for each individual user equipment unit (UE) involved in a connection controlled by serving radio network controller (RNC) $26_1$.

The FIG. 2 illustration of the first mode of the invention shows serving radio network controller (SRNC) $26_1$ releasing connections with all user equipment units (UEs) controlled by serving radio network controller (SRNC) $26_1$ by transmission of the omnibus release message from serving radio network controller (SRNC) $26_1$. In variations of the first mode, the omnibus release message can also be sent from a drift radio network controller such as drift radio network controller (DRNC) $26_2$.

Figure 2A:
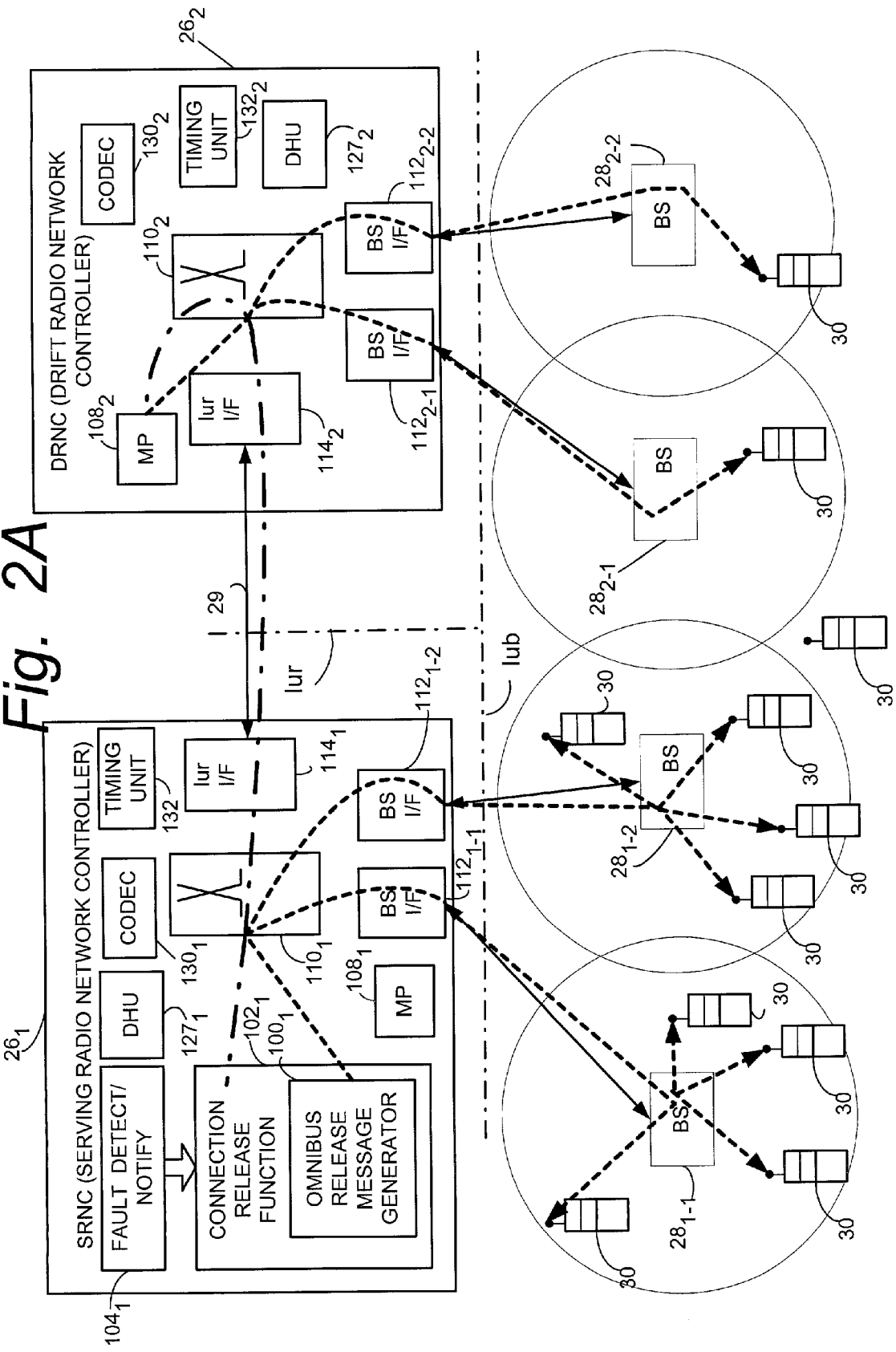
FIG. 2A and FIG. 2B are diagrammatic views showing variations of the first mode of FIG. 2.

In the above regard, FIG. 2A shows a first variation of the first mode wherein serving radio network controller (SRNC) $26_1$ sends a message to drift radio network controller (DRNC) $26_2$ with an explicit request to release connections with all user equipment units (UEs) which are controlled by serving radio network controller (SRNC) $26_1$. The request message sent from serving radio network controller (SRNC) $26_1$ to drift radio network controller (DRNC) $26_2$ is depicted by a dotted-dash line in FIG. 2A. The request message is received by an appropriate unit at drift radio network controller (DRNC) $26_2$ (e.g., main processor $108_2$), which unit then prepares and causes transmission of the omnibus release message to all cells (e.g., to all base station nodes) under control of the drift radio network controller (DRNC) $26_2$. The omnibus release message is shown by broken lines in FIG. 2A as being broadcast via switch $110_2$ both to base station $28_{2-1}$ and base station $28_{2-2}$. It should be understood that instead of a is broadcast message, separate omnibus release messages may be sent from main processor $108_2$ to each of base station $28_{2-1}$ and base station $28_{2-2}$.

Figure 2B:
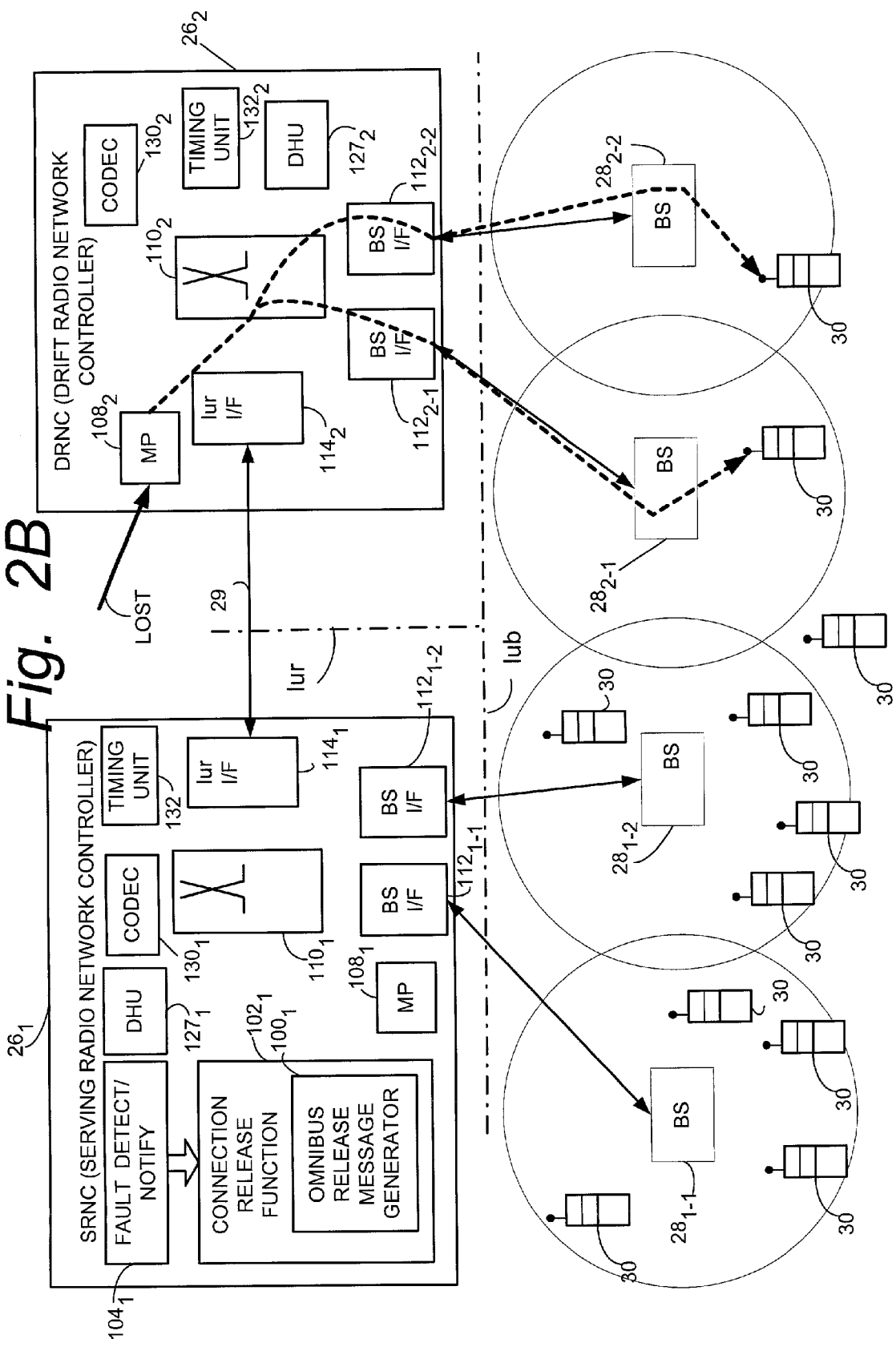

FIG. 2B shows a second variation of the first mode, and particular a variation in which drift radio network controller (DRNC) $26_2$ detects or receives an indication that its connection to serving radio network controller (SRNC) $26_1$ has been lost. FIG. 2B represents by arrow "LOST" receipt of an indication that the connection with serving radio network controller (SRNC) $26_1$ has been lost. Such indications can be provided from supervision functions in the signaling network, such as a signaling system 7 (SS7) network. In such case, drift radio network controller (DRNC) $26_2$ sends a omnibus release message to all cells (e.g., to all base station nodes) under control of the drift radio network controller (DRNC) $26_2$. The omnibus release message is shown by broken lines in FIG. 2B as being broadcast via switch $110_2$ both to base station $28_{2-1}$ and base station $28_{2-2}$. Again it should be understood that instead of a broadcast message, separate omnibus release messages may be sent from main processor $108_2$ to each of base station $28_{2-1}$ and base station $28_{2-2}$.

In conjunction with the variations represented by FIG. 2A and FIG. 2B, the drift radio network controller (DRNC) $26_2$ typically keeps information about all user equipment units (UEs) in cells under control of the drift radio network controller (DRNC) $26_2$. Such information may be in the URNTI of these user equipment units (UEs). In these variations of the first mode, the drift radio network controller (DRNC) $26_2$ can send the omnibus release message to all cells under its control, and include the SRNC-id of the appropriate SRNC and the SRNTI in the reserved range.

Figure 5:
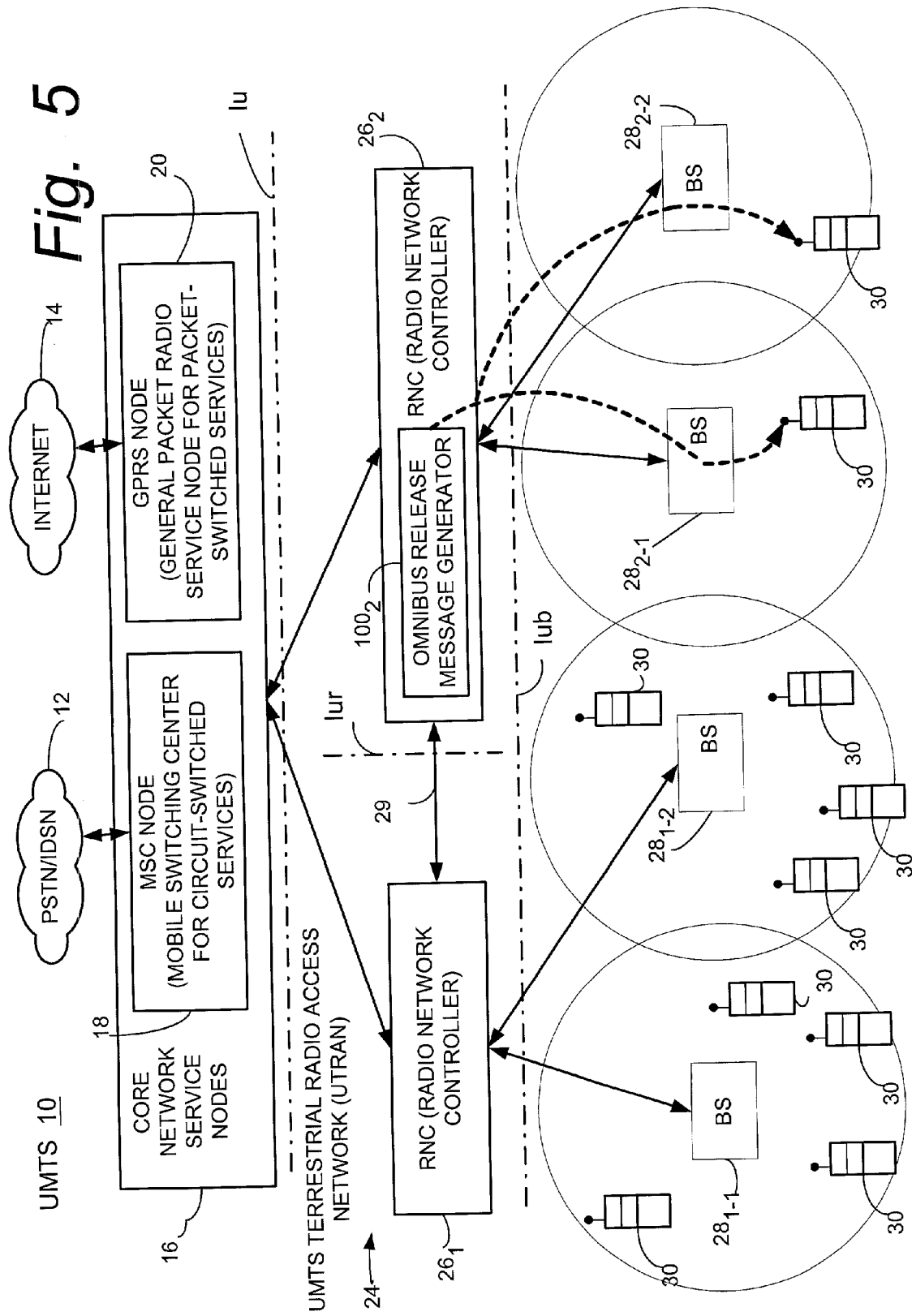
FIG. 5 is diagrammatic view of example mobile communications system showing usage of an omnibus release message to release plural radio connections according a second example mode of the present invention.
Figure 6:
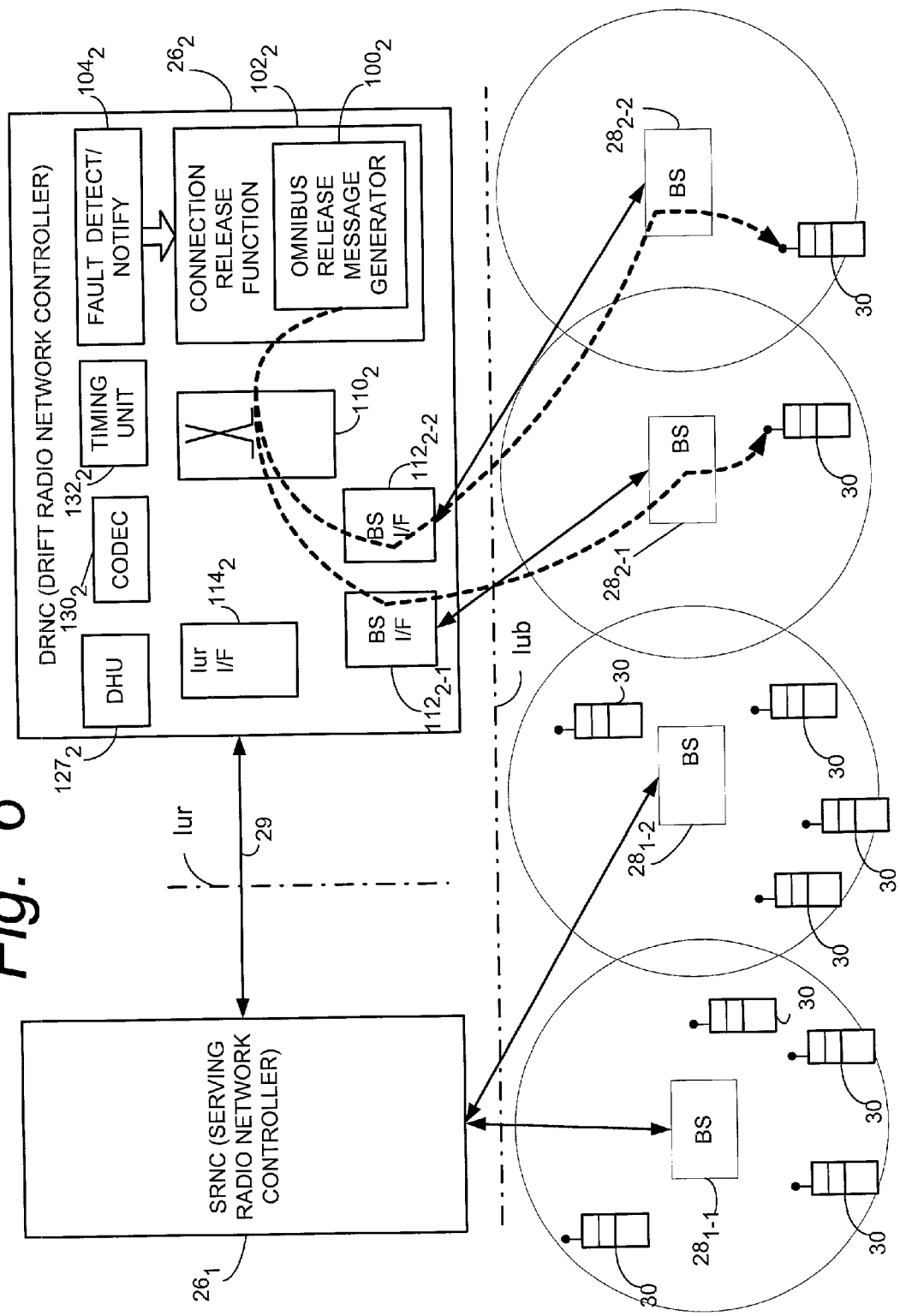
FIG. 6 is diagrammatic view showing, in more detailed, portions of a representative implementation of the example mobile communications system of the second mode of FIG. 5.

FIG. 5 depicts a second example mode of the present invention, wherein a control node in the form of drift radio network controller (DRNC) $26_2$ has an omnibus release message generator $100_2$. As shown by the broken line in FIG. 5, the omnibus release message produced by omnibus release message generator $100_1$ is applied by drift radio network controller (RNC) $26_2$ over the Iub interface to each of the base stations $28_{2-1}$ and $28_{2-2}$ controlled by drift radio network controller (RNC) $26_2$, since those base stations utilized radio resources controlled by drift radio network controller (DRNC) $26_2$. In this regard, recall that for sake of illustration radio network controller (DRNC) $26_2$ serves as a drift radio network controller for radio connections involving two user equipment units (UEs) 30, one of the user equipment units (UEs) being served by base station $28_{2-1}$ and another of the user equipment units (UEs) being served by base station $28_{2-2}$. FIG. 6 further illustrates that two other user equipment units (UEs) are also resident in each of the cells controlled by radio network controller (DRNC) $26_2$ (which functions as SRNC for radio connections for these other user equipment units (UEs). Again, illustrated examples of the number of user equipment units (UEs) per cell, the number of cells situated at a base station, and the number of base stations controlled by a RNC are variable and not constraints of the present invention.

FIG. 6 shows, in somewhat more detail, portions of a representative implementation of the second example mode of FIG. 5. As in the first example mode, the omnibus release message generator $100_2$ is shown as comprising a connection release function $102_2$, but with the connection release function $102_2$ being situated at drift radio network controller (DRNC) $26_2$. As stated previously, the connection release function $102_2$ serves to prepare a regular connection release message using a generic format. As in the first mode, the omnibus release message generator $100_2$ can be a special routine or subset of the connection release function $102_2$ as shown, or if desired can be a separate function or unit. When invoked the omnibus release message generator $100_2$ serves to transform a generic connection release message (such as that shown in FIG. 3) in to an omnibus release message of FIG. 7 which effects connection release of plural connections involving plural user equipment units (UEs) situated in cells controlled by drift radio network controller (DRNC) $26_2$.

In the illustrated embodiment, the omnibus release message generator $100_2$ is invoked when there is a fault or failure at drift radio network controller (DRNC) $26_2$. FIG. 6 shows a fault detect/notify unit $104_2$ which notifies connection release function $102_2$, and omnibus release message generator $100_2$ in particular, of a failure or fault at drift radio network controller (DRNC) $26_2$ which requires releasing of all radio connections to all user equipment units (UEs) in cells controlled by drift radio network controller (DRNC) $26_2$. The fault detect/notify unit $104_2$ can either itself detect faults or failures of drift radio network controller (RNC) $26_2$, or receive an external indication (e.g., from core network 16) of a perceived fault or failure at drift radio network controller (DRNC) $26_2$.

FIG. 7 shows how the omnibus release message generator $100_2$ of the first example mode of the invention transforms the generic connection release message of FIG. 3 into the inventive omnibus release message. In this regard, FIG. 7 (like FIG.4) depicts that the U-RNTI information element 7-I actually comprises two portions, i.e., the SRNC-id information element portion and the S-RNTI information element portion, discussed above.

When the omnibus release message generator $100_2$ of the second example mode of the invention is invoked (e.g., by fault detect/notify unit $104_2$) to generate a omnibus release message, the omnibus release message generator $100_2$ transforms the generic connection release message by inserting into the S-RNTI information element the (first) predetermined value in like manner as the first mode, and additionally inserts into the SRNC-id information element a second predetermined value. The omnibus release message of FIG. 7 as prepared by the omnibus release message generator $100_2$ of drift radio network controller (DRNC) $26_2$ causes all radio connections in cells controlled by the drift radio network control node to be released.

As in the first mode, and as described in FIG. 6, in the second mode the first selected parameter can belong to a first reserved range of values and the second selected parameter can belong to a second reserved range of values. Thus, in the example implementation of the second mode, both the first selected parameter and the second selected parameter are included in a mobile terminal global identity information element of the omnibus release message, e.g., in a Radio Network Temporary Identity (U-RNTI) information element of the omnibus release message. For example, the first selected parameter can be in a Serving Radio Network Temporary Identity (S-RNTI) information element, while the second selected parameter can be included in an information element which identifies a serving radio network control (SRNC) node.

As in the first example mode, in the second example mode the omnibus release message generator $100_2$ can generate a single omnibus release message which is broadcast/multicast via switch $110_2$ to each of the base stations $28_{2-1}$ and $28_{2-2}$. Alternatively, the omnibus release message generator $100_2$ can generate, e.g., in seratim, separate omnibus release messages for each base station under its control.

Upon receipt of their copies of the omnibus release message, each base station $28_{2-1}$ and $28_{2-2}$ transmits the payload of the omnibus release message over the air interface to all user equipment units (UEs) served by cells controlled by drift radio network controller (DRNC) $26_2$. Receipt and processing of a omnibus release message at an example user equipment unit (UE) (depicted by a broken line in FIG. 8) is in the same manner as previously described. And results in the user equipment unit (UE) entering the idle mode, as hereinafter described with reference to FIG. 9.

It should be understood that the more detailed structure illustrated in FIG. 2, FIG. 2A, FIG. 2B for the first mode, and in FIG. 6 for the second mode, is not limiting, and that other structures and arrangements can instead be utilized. In this regard, while the particular radio network control (RNC) nodes thus far described have been illustrated as being switched-based nodes, such is not a requirement of the present invention and other ways of applying omnibus release messages is within the scope of the present invention.

It will further be appreciated that the first mode and the second mode of the invention can be used in combination. For example, assume that it is desired to release all user equipment units (UEs) that have a given RNC either as their SRNC or their DRNC, e.g., at failure and/or restart of that RNC. In such scenario the first mode can be employed to release all user equipment units (UEs) having the RNC as SRNC, while the second mode can be utilized to release all user equipment units (UEs) having the RNC as DRNC.

Thus, the present invention solves the problems of the prior art by, e.g., facilitating addressing of many user equipment units (UEs) in the same connection release message, e.g., the omnibus release message of the present invention. In the first mode of the invention, a predetermined value or reserved value range of the U-RNTI is used as a broadcast address or group address, thereby permitting addressing of several user equipment units (UEs). In the first mode of the invention, a U-RNTI having an appropriate SRNC-id for the serving radio network controller (RNC) $26_1$ and a value of the S-RNTI information element being the predetermined value (or in the reserved range) addresses all user equipment units (UEs) belonging the particular serving radio network controller (RNC) $26_1$.

In the second mode of the invention, when a connection release message generated by drift radio network controller (DRNC) $26_2$ bears in its SRNC-id information element a second predetermined value (or a value in a second reserved range), and bears in its S-RNTI information element the first predetermined value or a value in the first reserved range, it will be recognized as an omnibus release message and will all user equipment units (UEs) in cells controlled by drift radio network controller (DRNC) $26_2$.

Figure 9:
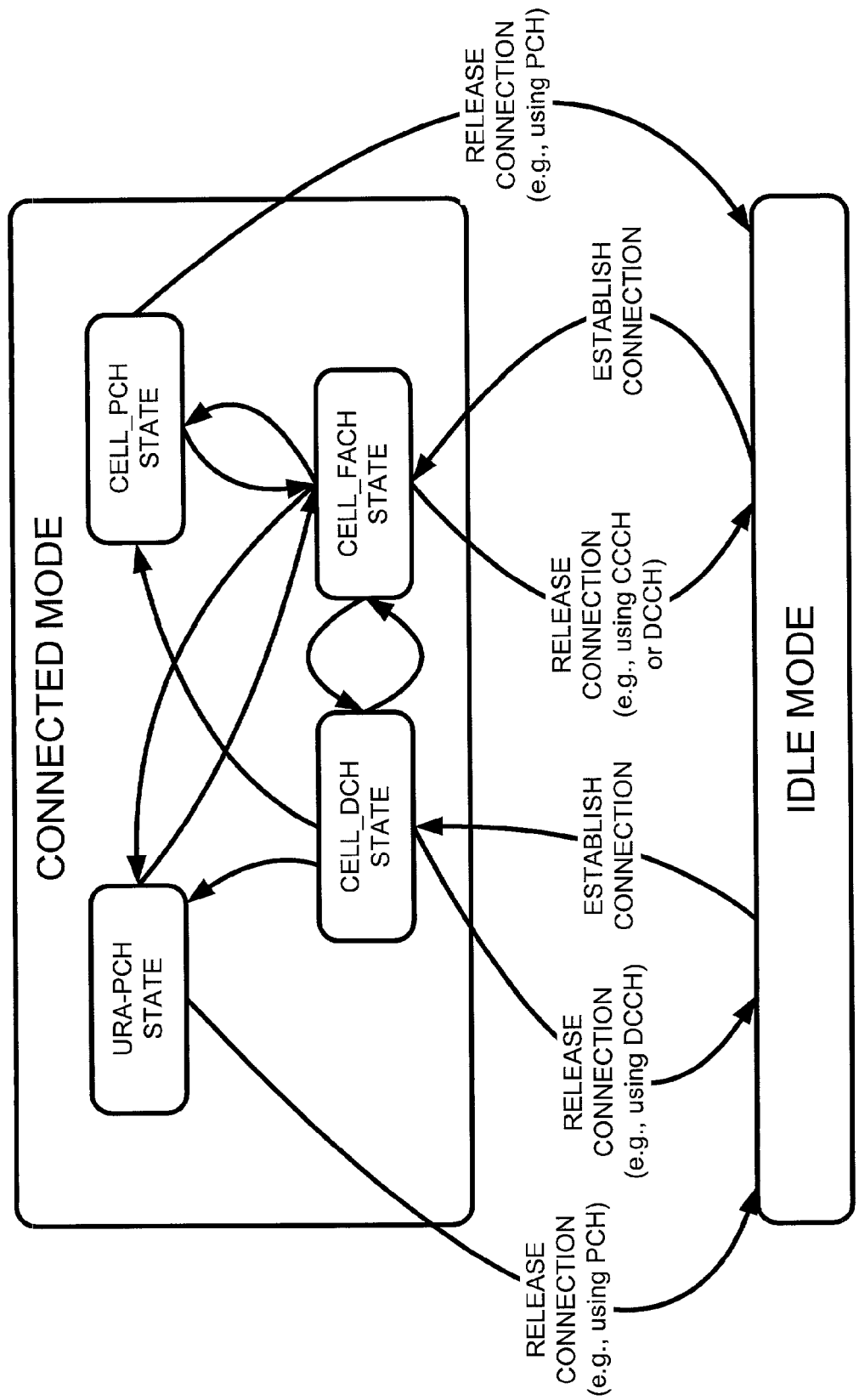
FIG. 9 is a diagrammatic view showing modes and states of a user equipment unit (UE) pertinent to the present invention.

FIG. 9 shows a state model relevant to a user equipment unit (UE) for the present invention. The Idle Mode is entered after power on of the user equipment unit (UE). In the Idle Mode there is no connection between the user equipment unit (UE) and the UTRAN. When a connection is established, the user equipment unit (UE) is assigned a U-RNTI and the user equipment unit (UE) enters the Connected Mode.

Within the Connected Mode there are four different states. As discussed separately below, each state reflects a different level of activity.

The CELL_DCH state is characterized by that there is a dedicated channel (DCH) assigned to the user equipment unit (UE). Macro-diversity may be used between DCHs of several cells. In the CELL_DCH state, there is a dedicated control channel (DCCH) used for transmission of signalling messages between the user equipment unit (UE) and the UTRAN.

In the CELL_FACH state, no dedicated physical channel is assigned, but the user equipment unit (UE) listens continuously to a common channel (the FACH) in the downlink belonging to the selected cell. In the uplink, the user equipment unit (UE) typically uses a random access channel (RACH). At each cell reselection, the user equipment unit (UE) updates the network with its current cell location. In this state, there is a dedicated control channel (DCCH) used for transmission of signalling messages between the user equipment unit (UE) and the UTRAN. The DCCH is implemented by appending the Radio Network Temporary Identity (U-RNTI or C-RNTI) to all signalling messages, and thus addressing an individual UE. As mentioned previously, the U-RNTI (UTRAN RNTI) is a global identity, which can be used in any cell in the UTRAN. The C-RNTI (Cell RNTI) is only significant in a single cell, and has to be reallocated in every cell. On the other hand, C-RNTI is much shorter than the U-RNTI which saves space over the radio interface when it is used. There is also a CCCH (Common control channel) in this state, which is used when the connection to the SRNC is not available, such at after cell reselection over RNC borders, when the CELL UPDATE or URA UPDATE message is sent to the DRNC.

In the CELL_PCH state, the user equipment unit (UE) monitors a paging channel (PCH) of a selected cell. On the PCH, the user equipment unit (UE) uses discontinuous reception (DRX) to save power, and the scheme for when to listen is agreed between the network and the user equipment unit (UE) on a per user equipment unit (UE) basis. Also in the CELL_PCH state the user equipment unit (UE) updates the network with its current cell location at cell reselection. No DCCH is available in the CELL_PCH state. On the PCH, means for addressing individual user equipment units (IUEs) exist (using the U-RNTI), but the user equipment unit (UE) can not transport any signalling messages to the network.

The URA_PCH state is almost identical to the CELL-_PCH state. The difference is that the user equipment unit (UE) does only update the network of its location after crossing URA borders. An URA (UTRAN Registration Area) is a group of cells. This means that in this state the position of the user equipment unit (UE) is in general known only on URA level.

Release of a radio connection between the radio access network (like UTRAN) and the mobile terminal (like the UE) requires that the mobile terminal leave the connected mode and enter idle mode (see FIG. 9).

The RELEASE message can be sent on the CCCH, in CELL_FACH state. However, in CELL_PCH and URA_PCH states there is no CCCH. It has been described in U.S. patent application Ser. No. 09/724,754, filed Nov. 28, 2000 and entitled "RELEASE OF USER EQUIPMENT UNIT USING A PAGE PROCEDURE IN A CELLULAR COMMUNICATIONS SYSTEM"[incorporated by reference in its entirety], that the PCH can be used for transmitting a RELEASE message. If the PCH is so used, with the concept of broadcast or group U-RNTI of the present invention, several user equipment units (UEs) in the CELL_PCH and the URA_PCH state can be neatly released by a single message on the PCH.

Thus, from the foregoing it can be seen that one aspect of the present invention concerns a method of operating a radio access network wherein plural radio connections are released using an omnibus release message. Another aspect of the present invention concerns the radio access network, and a control node thereof, which releases the plural radio connections using the omnibus release message. Yet another aspect of the present invention is a mobile terminal which recognizes the omnibus release message transmitted from the radio access network, and which releases its radio connection in response thereto.

Advantageously, the present invention significantly reduces the amount of signalling required upon RNC failure, since one message can be directed or transmitted to plural user equipment units (UEs). The time delay for release of each connection is reduced, in case many user equipment units (UEs) need to be released at the same time. This will give better service for the user and reduce the risk of allocating an RNTI which is already in use after restart. Importantlly, the signalling load in the network, the RNC load, and the radio resources need for the signalling are all reduced.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of operating a radio access network of a telecommunications system, the radio access network comprising a radio network control (RNC) node, wherein the method comprises:
   ascertaining a failure of the radio network control node; and, upon such failure,
   preparing an omnibus release message with a first selected parameter thereof having a predetermined value to indicate that all connections controlled by the radio network control (RNC) node are to be released.

2. The method of claim 1, wherein when the first selected parameter is in a reserved range of values, all radio connections controlled by the radio network control (RNC) node are released.

3. The method of claim 1, wherein the radio network control (RNC) node is a serving radio network control (SRNC) node, and further comprising preparing the omnibus release message upon failure of the serving radio network control (SRNC) node.

4. The method of claim 1, wherein the first selected parameter is included in a mobile terminal global identity information element of the omnibus release message.

5. The method of claim 4, wherein the first selected parameter is included in a Radio Network Temporary Identity (U-RNTI) information element of the omnibus release message.

6. A method of operating a radio access network of a telecommunications system, the radio access network comprising a radio network control (RNC) node, the method comprising preparing an omnibus release message whereby, when a Serving Radio Network Temporary Identity (S-RNTI) information element of the omnibus release message has a predetermined value, plural connections handled by the radio access network are released.

7. The method of claim 1 wherein the method further comprises preparing the omnibus release message whereby, when a first selected parameter thereof has a first predetermined value and a second selected parameter thereof has a second predetermined value, all radio connections in cells controlled by the radio network control (RNC) node are released.

8. The method of claim 7, wherein when the first selected parameter is in a first reserved range of values, all radio connections in cells controlled by the radio network control (RNC) node are released.

9. The method of claim 7, wherein when the second selected parameter is in a second reserved range of values, all radio connections in cells controlled by the radio network control (RNC) node are released.

10. The method of claim 7, wherein the radio network control (RNC) node is a drift radio network control (DRNC) node, and further comprising preparing the omnibus release message upon failure of the drift radio network control (DRNC) node.

11. The method of claim 7, wherein the first selected parameter is included in a mobile terminal global identity information element of the omnibus release message.

12. The method of claim 11, wherein the first selected parameter is included in a Radio Network Temporary Identity (U-RNTI) information element of the omnibus release message.

13. The method of claim 12, wherein the first selected parameter is in a Serving Radio Network Temporary Identity (S-RNTI) information element of the omnibus release message.

14. The method of claim 7, wherein the second selected parameter is included in a parameter which identifies a serving radio network control (SRNC) node.

15. A method of operating a radio access network of a telecommunications system, the method comprising:
   using an omnibus release message to release plural connections handled by the radio access network;
   transmitting the omnibus release message on a common control channel (CCCH) when a mobile terminal is in a CELL_FACH state.

16. The method of claim 1, further comprising transmitting the omnibus release message on a paging channel (PCH).

17. A method of operating a radio access network of a telecommunications system, the radio access network comprising a serving radio network controller node and a drift radio network controller node, and wherein the method comprises: sending from the serving radio network controller node to the drift radio network controller node a request for release of connections with mobile terminals controlled by the serving radio network controller node in cells controlled the drift radio network controller node;
   preparing an omnibus release message to release plural connections handled by the radio access network;

sending the omnibus release message from the drift radio network controller node to base station(s) controlled by the drift radio network controller node.

18. A method of operating a radio access network of a telecommunications system, the radio access network comprising a serving radio network controller node and a drift radio network controller node, and wherein the method comprises:
receiving at the drift radio network controller node an indication of a loss of connection with the serving radio network controller node;
preparing an omnibus release message to release plural connections handled by the radio access network;
sending the omnibus release message from the drift radio network controller node to base station(s) controlled by the drift radio network controller node with respect to connections with mobile terminals controlled by the serving radio network controller node in cells controlled the drift radio network controller node.

19. A radio access network of a telecommunications system comprising a radio network control (RNC) node which ascertains a failure of the radio network control node and, upon such failure, prepares an omnibus release message with the omnibus release message with a first selected parameter of the omnibus release message having a predetermined value to indicate that all radio connections controlled by the radio network control (RNC) node are to be released.

20. The radio access network of claim 19, wherein when the first selected parameter is in a reserved range of values, all radio connections controlled by the radio network control (RNC) node are released.

21. The radio access network of claim 19, wherein the radio network control (RNC) node is a serving radio network control (SRNC) node, and wherein the serving radio network control (SRNC) node prepares the omnibus release message upon failure of the serving radio network control (SRNC) node.

22. The radio access network of claim 19, wherein the first selected parameter is included in a mobile terminal global identity information element of the omnibus release message.

23. The radio access network of claim 22, wherein the first selected parameter is included in a Radio Network Temporary Identity (U-RNTI) information element of the omnibus release message.

24. A radio access network of a telecommunications system comprising a radio network control (RNC) node which prepares an omnibus release message whereby, when a Serving Radio Network Temporary Identity (S-RNTI) information element of the omnibus release message has a predetermined value, plural connections handled by the radio access network are released.

25. The radio access network of claim 19, wherein when a first selected parameter of the omnibus release message has a first predetermined value and a second selected parameter of the omnibus release message has a second predetermined value, all radio connections in cells controlled by the radio network control (RNC) node are released.

26. The radio access network of claim 25, wherein when the first selected parameter is in a first reserved range of values, all radio connections in cells controlled by the radio network control (RNC) node are released.

27. The radio access network of claim 25, wherein when the second selected parameter is in a second reserved range of values, all radio connections in cells controlled by the radio network control (RNC) node are released.

28. The radio access network of claim 25, wherein the radio network control (RNC) node is a drift radio network control (DRNC) node, and wherein the drift radio network control (DRNC) node prepares the omnibus release message upon failure of the drift radio network control (DRNC) node.

29. The radio access network of claim 25, wherein the first selected parameter is included in a mobile terminal global identity information element of the omnibus release message.

30. The radio access network of claim 29, wherein the first selected parameter is included in a Radio Network Temporary Identity (U-RNTI) information element of the omnibus release message.

31. The radio access network of claim 30, wherein the first selected parameter is in a Serving Radio Network Temporary Identity (S-RNTI) information element of the omnibus release message.

32. The radio access network of claim 25, wherein the second selected parameter is included in a parameter which identifies a serving radio network control (SRNC) node.

33. A radio access network of a telecommunications system, the radio access network comprising a radio network control (RNC) node which prepares a omnibus release message to release plural connections handled by the radio access network, and wherein the omnibus release message is transmitted on a common control channel (CCCH) when a mobile terminal is in a $CELL_{13}$ FACH state.

34. The radio access network of claim 19, wherein the omnibus release message is transmitted on a paging channel (PCH).

35. A radio access network of a telecommunications system comprising:
a serving radio network controller node;
a drift radio network controller node;
wherein the serving radio network controller node sends to the drift radio network controller node a request for release of connections with mobile terminals controlled by the serving radio network controller node in cells controlled the drift radio network controller node; and
wherein the drift radio network controller node sends an omnibus release message to base station(s) controlled by the drift radio network controller node to release plural connections handled by the radio access network.

36. A radio access network of a telecommunications system comprising:
a serving radio network controller node;
a drift radio network controller node;
wherein the drift radio network controller node receives an indication of a loss of connection with the serving radio network controller node, and thereafter sends an omnibus release message to base station(s) controlled by the drift radio network controller node to release plural connections with mobile terminals controlled by the serving radio network controller node in cells controlled the drift radio network controller node.

37. A radio network control (RNC) node of a radio access network of a telecommunications system which ascertains a failure of the radio network control node and, upon such failure, prepares an omnibus release message, a first selected parameter of the omnibus release message having a predetermined value to indicate that all radio connections controlled by the radio network control (RNC) node are to be released.

38. The radio network control (RNC) node of claim 37, wherein when the first selected parameter is in a reserved range of values, all radio connections controlled by the radio network control (RNC) node are released.

39. The radio network control (RNC) node of claim 37, wherein the radio network control (RNC) node is a serving radio network control (SRNC) node, and wherein the serving radio network control (SRNC) node prepares the omnibus release message upon failure of the serving radio network control (SRNC) node.

40. The radio network control (RNC) node of claim 37, wherein the first selected parameter is included in a mobile terminal global identity information element of the omnibus release message.

41. The radio network control (RNC) node of claim 40, wherein the first selected parameter is included in a Radio Network Temporary Identity (U-RNTI) information element of the omnibus release message.

42. A radio network control (RNC) node of a radio access network of a telecommunications system which prepares an omnibus release message whereby, when a Serving Radio Network Temporary Identity (S-RNTI) information element of the omnibus release message has a predetermined value, plural connections handled by the radio access network are released.

43. The radio network control (RNC) node of claim 37, wherein when a first selected parameter of the omnibus release message has a first predetermined value and a second selected parameter of the omnibus release message has a second predetermined value, all radio connections in cells controlled by the radio network control (RNC) node are released.

44. The radio network control (RNC) node of claim 43, wherein when the first selected parameter is in a first reserved range of values, all radio connections in cells controlled by the radio network control (RNC) node are released.

45. The radio network control (RNC) node of claim 43, wherein when the second selected parameter is in a second reserved range of values, all radio connections in cells controlled by the radio network control (RNC) node are released.

46. The radio network control (RNC) node of claim 43, wherein the radio network control (RNC) node is a drift radio network control (DRNC) node, and wherein the drift radio network control (DRNC) node prepares the omnibus release message upon failure of the drift radio network control (DRNC) node.

47. The radio network control (RNC) node of claim 43, wherein the first selected parameter is included in a mobile terminal global identity information element of the omnibus release message.

48. The radio network control (RNC) node of claim 47, wherein the first selected parameter is included ma Radio Network Temporary Identity (U-RNTI) information element of the omnibus release message.

49. The radio network control (RNC) node of claim 48, wherein the first selected parameter is in a Serving Radio Network Temporary Identity (S-RNTL) information element of the omnibus release message.

50. The radio network control (RNC) node of claim 43, wherein the second selected parameter is included in a parameter which identifies a serving radio network control (SRNC) node.

51. The radio network control (RNC) node of claim 37, wherein the omnibus release message is transmitted on a common control channel (CCCH) when a mobile terminal is in a $CELL_{13}$ FACH state.

52. The radio network control (RNC) node of claim 37, wherein the omnibus release message is transmitted on a paging channel (PCH).

53. A radio network control node of a radio access network of a telecommunications system, the radio network control node being a drift radio network control node which receives from a serving radio network control node a request for release of connections with mobile terminals controlled by the serving radio network controller node in cells controlled the drift radio network controller node; and wherein the drift radio network controller node sends an omnibus release message to base station(s) controlled by the drift radio network controller node to release plural connections handled by the radio access network.

54. A radio network control node of a radio access network of a telecommunications system, the radio network control node being a drift radio network control node which receives an indication of a loss of connection with the serving radio network controller node, and which thereafter sends an omnibus release message to base station(s) controlled by the drift radio network controller node to release plural connections handled by the radio access network with mobile terminals controlled by the serving radio network controller node in cells controlled the drift radio network controller node.

55. A mobile terminal which, upon receipt of a release message from a radio access network of a telecommunications system, releases its radio connection with the radio access network when a first selected parameter of the omnibus release message has a predetermined value which is not unique to the mobile terminal and which causes release of all connections handled by a radio network control node of the radio access network upon a failure of the radio network control node.

56. The mobile terminal of claim 55, wherein when the first selected parameter is in a reserved range of values, the mobile terminal releases its radio connection with the radio access network.

57. The radio access network of claim 55, wherein the first selected parameter is included in a mobile terminal global identity information element of the omnibus release message.

58. The mobile terminal of claim 55, wherein the first selected parameter is included in a Radio Network Temporary Identity (U-RNTI) information element of the release message.

59. A mobile terminal which, upon receipt of an omnibus release message from a radio access network of a telecommunications system, releases its radio connection with the radio access network when a first selected parameter of the omnibus release message has a predetermined value which is not unique to the mobile terminal, wherein the first selected parameter is in a Serving Radio Network Temporary Identity (S-RNTI) information element of the release message.

60. A mobile terminal which, upon receipt of an omnibus release message from a radio access network of a telecommunications system, releases its radio connection with the radio access network when a first selected parameter of the omnibus release message has a predetermined value which is not unique to the mobile terminal, wherein the release message is received on a common control channel (CCCH) when the mobile terminal is in a $CELL_{13}$ FACH state.

61. The mobile terminal of claim 55, wherein the release message is received on a paging channel (PCH).

* * * * *